United States Patent

Warmbier et al.

[11] Patent Number: 5,540,886
[45] Date of Patent: Jul. 30, 1996

[54] PROCESS AND DEVICE FOR THERMAL TREATMENT OF GAS, IN PARTICULAR THERMAL AND/OR CATALYTIC AFTER-BURNING OF WASTE GAS

[75] Inventors: Bernd Warmbier, Hemslingen; Bernd Klinge, Leipzig; Ingo Birnkraut, Halstenbek; Werner Lautenschläger, Leutkirch, all of Germany

[73] Assignee: Gossler Feuerfest- und Isoliertechnik GmbH, Reinbek, Germany

[21] Appl. No.: 204,267

[22] PCT Filed: Jul. 8, 1993

[86] PCT No.: PCT/EP93/01789

§ 371 Date: May 11, 1994

§ 102(e) Date: May 11, 1994

[87] PCT Pub. No.: WO94/01202

PCT Pub. Date: Jan. 20, 1994

[30] Foreign Application Priority Data

Jul. 8, 1992 [DE] Germany .................. 42 22 469.1

[51] Int. Cl.$^6$ .................. A61L 2/00; F23G 5/00
[52] U.S. Cl. .................. 422/21; 422/173; 422/198; 422/186; 422/110; 422/108; 60/275; 110/250
[58] Field of Search .................. 422/173, 174, 422/21, 199, 198, 111, 109, 114, 186, 110, 108; 110/250, 346, 210; 60/275, 303; 219/679, 687, 690, 693; 431/5

[56] References Cited

U.S. PATENT DOCUMENTS

| 4,006,339 | 2/1977 | Maurer | 219/693 |
| 4,718,358 | 1/1988 | Nomi et al. | 110/250 |
| 4,937,411 | 6/1990 | Suzuki et al. | 219/679 |
| 5,087,272 | 2/1992 | Nixdorf | 60/275 |
| 5,174,042 | 12/1992 | Tomizawa et al. | 219/679 |
| 5,180,559 | 1/1993 | Ma | 422/174 |
| 5,254,818 | 10/1993 | Aubert | 219/687 |

FOREIGN PATENT DOCUMENTS

| 0185931B1 | 7/1986 | European Pat. Off. | F23G 5/10 |
| 0454937A1 | 11/1991 | European Pat. Off. | B01D 53/36 |
| 3-78514 | 4/1991 | Japan | 60/303 |

Primary Examiner—Robert J. Warden
Assistant Examiner—Hien Tran
Attorney, Agent, or Firm—Fitzpatrick, Cella, Harper & Scinto

[57] ABSTRACT

The invention relates to a process for thermal treatment of gas, in particular for thermal and/or catalytic after-burning of waste gas, in which the gas is conducted through a gas-permeable, in particular fibrous or porous body, which consists at least partly of material which absorbs microwaves, and in which the body is heated by irradiation with microwaves and the gas is heated when flowing through the body, by contact with said body.

19 Claims, 1 Drawing Sheet

PROCESS AND DEVICE FOR THERMAL TREATMENT OF GAS, IN PARTICULAR THERMAL AND/OR CATALYTIC AFTER-BURNING OF WASTE GAS

The most environmentally friendly elimination of gaseous organic air pollutant substances resulting from technical processes is conventionally realised by thermal after-burning. A support firing is generally required and employed in order to provide adequate conversion of the organic compounds.

In thermal after-burning, fossil fuel—adapted to the hydrocarbon content of the waste gas—is additionally burnt in order to ensure the necessary thermal reaction efficiency.

Catalytic processes require additional energy, dependent on substances and concentrations, at least in the starting phase, which energy is generally realized by a combustion device. Mechanical and thermal stability as well as the rate of deactivation of the catalysts thereby substantially determine the economic efficiency for the operator and restrict the range of possible applications.

The object of the invention is to find an available process and a device for carrying out the process which enable a simple, environmentally friendly and economical treatment of the gas.

This object is achieved with the features of the invention hereinafter described.

In the process according to the invention microwave heating of the gas takes place which replaces a support firing and can not only be more simply controlled and adapted to the necessary conditions, but is also more effective since with microwave heating the available surface of the body, through which the gas to be treated is conducted, participates in the gas treatment, in this case the heating of the gas. As a result, an oxidative conversion of the component pollutant substances is ensured with the invention, without additional production of secondary air pollutant substances (such as carbon dioxide and nitrogen oxides) resulting from a support firing. A reliable treatment of the gas is thereby achieved, in particular the conversion of problematic hydrocarbon systems, which is of particular importance for thermal after-burning devices and processes. Moreover, favourable effects can be achieved with the invention by using specific quasi-catalytic additional effects, in particular with waste gas components with polar molecular properties.

A further advantage is provided in the reliable process design with a simple control or regulation taking into account the parameters available, such as temperature and pressure in the region of the device.

The above-mentioned advantages are also achieved with the device according to the invention, which device is distinguished by a simple construction with a simple and reliable function. A small and compact construction is also achieved because the reactor and the burner form one unit. It is thereby advantageous to design the surface of the body in contact with the gas to be as large as possible. Preferably a fibrous or porous material is suitable for this purpose, through which material the gas is led. The material is completely or at least partly microwave absorptive material, e.g. SiC or C, which is suitable for bearing oxidative action and which is manufactured accordingly. When the thus-formed reactor or burner is acted upon, the material is excited by the microwaves so that, on its way through the material, the gas flow receives an even indirect heating and, in particular in the case of after-burning of waste gas exploiting the combustion enthalpy contained—corresponding to the proportion of hydrocarbons, as well as possibly additionally exploiting the self-excitation effect of waste gas molecules through direct microwave action, is converted evenly in an oxidative manner.

The control of the treatment process, with regard to the heating and/or the gas quantity and/or the gas composition, taking into account the process parameters such as temperature and pressure, can take place in, in front of and/or behind the body. As a result, it is possible in an advantageous manner to reduce the microwave energy with increasing temperature and to increase the microwave energy with falling temperature, so that regulation to a selectable actual temperature value can be effected, or a determined temperature progression is achieved.

This also applies correspondingly with regard to the process pressure or pressures.

It is advantageous to start the treatment process with air which is free of pollutant substances. If a certain pressure is present at the output of the device, which pressure can be determined readily by means of a suitable sensor, the microwave generator is switched on so that the reactor or burner starts to operate. Once the reaction temperature is reached, which likewise can easily be determined by means of a suitable sensor, the supply of the air free of pollutant substances is reduced and the supply of the waste gas to be treated takes place.

Additional features are described hereinafter which contribute to solving the problem, improve the functional reliability, facilitate a simple construction and a simple control or regulation, ensure a long life and moreover facilitate exploitation of the heat present in the waste gas to be treated.

BRIEF DESCRIPTION OF THE DRAWINGS

In the following the invention and further advantages which can be achieved therewith are explained in more detail with reference to preferred exemplary embodiments and the drawing, in which:-

DETAILED DESCRIPTION OF THE PREFERRED EMBODIMENTS

Figure 1:
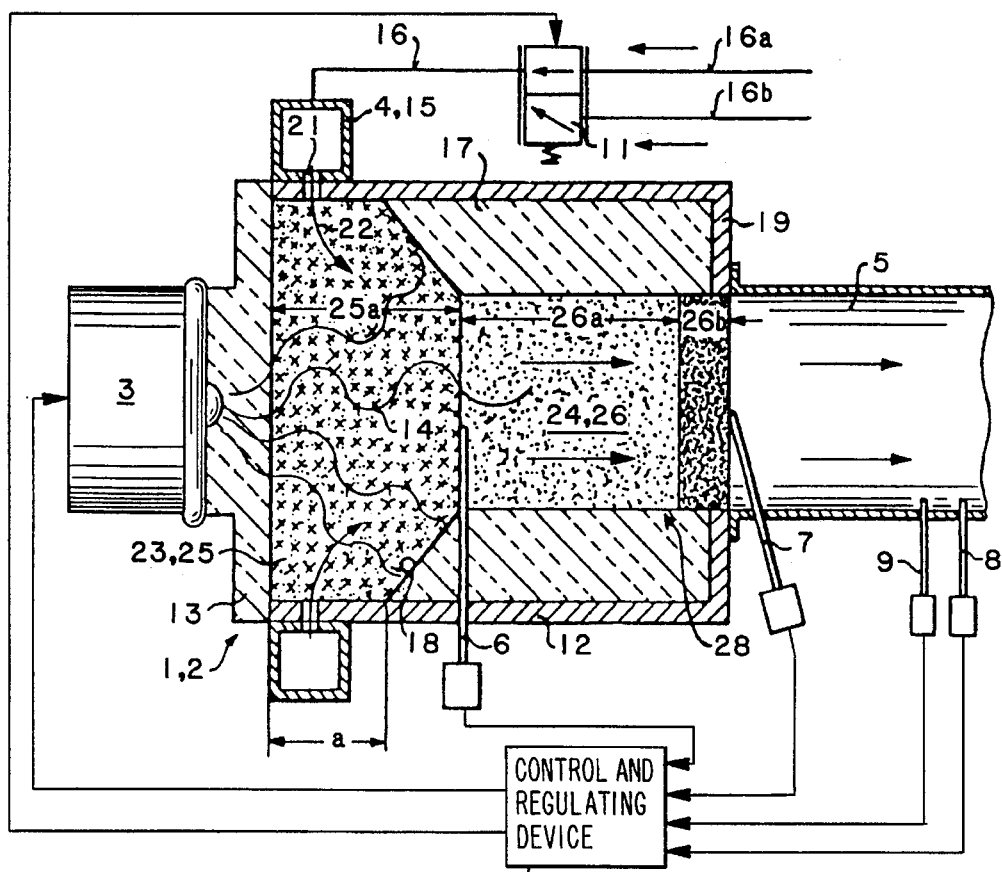
FIG. 1 shows a device according to the invention in axial longitudinal section.

The main parts of the device 1 are a reactor housing 2, a microwave generator 3, a feed line 4 for the air free of pollutant substances and/or for the waste gas, a gas discharge line 5, two temperature sensors 6,7, a gas pressure sensor 8, a sensor 9 for determining the waste gas concentration, a so-called substance sensor, and a control and regulating device 10 which is connected through signal lines to the microwave generator 3, the sensors 6 to 9 and a control or changeover valve 11 (3/2 port directional control valve) which is for example electromagnetic, in order to receive control signals communicated by these parts or to pass on control signals to the microwave generator 3 to change the microwave energy based on the temperature which is sensed or the changeover valve 11 to control the relative amounts of waste gas and air free of pollutants according to the temperature which is sensed.

The housing 2 consists of a thin, preferably cylindrical protective casing 12, which on its one end side, in this case the left end side, is connected, especially directly sealed, to an end plate 13 of material which is permeable to microwaves, e.g. plastics or $SiO_2$ ceramics, for the purpose of sealing and heat insulation. The microwave generator 3 is arranged, preferably on the outside of the end plate 13, in such a manner that it feeds the microwaves 14 into the housing 2 in a substantially coaxial manner. The feed line 4 is a ring line 15, surrounding the housing 2 in the region adjacent to the end plate 13, connected to a supply line 16 which, through the changeover valve 11, is able to be connected as desired to a supply line 16a for air which is free of pollutant substances and/or a supply line 16b for waste gas for thermal-catalytic after-burning. The changeover valve 11 can be a so-called proportional valve i.e. the valve can also assume controlled intermediate positions, so that air free of pollutant substances, waste gas or even a mixture can be supplied. In the present exemplary embodiment, for example, waste air containing hydrocarbons is supplied.

In the protective casing 12 there is located a preferably hollow cylindrical inner casing 17, which, like the end plate 13, can consist of material which is permeable to microwaves and is provided for the purpose of sealing and heat insulation. The inner casing 17 is arranged at an axial spacing a from the left end of the protective casing or from the end plate 13 or from the associated layer boundary, wherein this end surface 18 of the inner casing 17 is shaped like a hollow cone. On the other end thereof, namely the front end, the protective casing 12 abuts, on an inner flange 19 of the protective casing 12. In order to connect the ring line 15 to the inner chamber of the housing 2 radial slits or holes 21 are provided arranged distributed over the periphery. The gas flow 22 in the housing 2 thus runs from the ring line 15 firstly radially inwardly and then, in the form of an arch, passes over to a coaxial direction extending to the right, wherein the gas flow 22, in the first instance, flows through a first housing chamber 23, which occupies the left inner region of the reactor housing 2 and is arranged inside the ring line 15 and then flows through a second housing chamber adjoining the first, said chambers being arranged coaxially one with the other, wherein the second housing chamber 24 is surrounded by the inner casing 17 and the preferably inner conical-shaped end face 18 of the inner casing 17 creates a flow-favourable transition between the chambers 23,24.

The first housing chamber 23 is filled with a material 25 which is permeable to microwaves and gas; and preferably, fibrous or porous material. This can be an appropriately preformed insert body, or material inserted loose. The second housing chamber 24 is filled with a material 26 with a microwave-absorbing property. This is a gas-permeable, in porous, body of fibres, composite fibre material or preferably porous ceramics, e.g. foamed ceramics. This can also be a material rendered porous mechanically e.g. foamed ceramics. As in the case of the material 25, material 26 can also be an appropriately prefabricated body or a material introduced loose.

In addition a catalytically active material can be provided in particular on the outlet side in the second housing chamber 24. Here, a catalytically active coating or doping of the material 26 can be provided for applications which are suitable in terms of substances, e.g. by a coating containing platinum, palladium or other noble and semi-noble metal particles or semi-noble metal oxide particles in finely dispersed form, on a base of aluminium.

Moreover one or several catalytically active separate layer or layers, e.g. one or several porous aluminum silicate foam bodies 26b, with additional catalytic coating or content, possibly differentiated in terms of substances or with regard to the activity, can be placed downstream of the material 26a also on the outlet side, as indicated above.

The microwave excitability of the catalytically active layer, possibly present depending on the substance, can be used to lower further the energy requirement for the conversion process.

One, or preferably two, temperature sensors 6,7, for determining the temperature is/are provided in the reactor chamber 28 formed in the present exemplary embodiment by the second housing chamber 24. The first temperature sensor 6 is located in the starting region of the housing chamber 24 preferably between the two materials 25, 26, whilst the second temperature sensor 7 is arranged in the end region. The temperature sensors 6,7 are measuring tongues or rods, which penetrate from outside the reactor housing 2 or associated built-on parts and reach as far as the reactor chamber 28 or project into it.

The gas pressure sensor 8 and the substance sensor 9 are arranged to penetrate the wall of the gas discharge line 5 at a small spacing from each other in the direction of gas flow.

The operation of the device is described in the following with reference to a microwave-supported, thermal, particularly thermal-catalytic combustion process.

The waste gas to be treated or for after-burning e.g. waste gas containing carbon is led in the direction of the arrow through the device 1. This can occur because of an upstream excess pressure or a downstream low pressure which arises during operation, or can be generated by means of a suitable blower. At the same time the microwave generator 3 is set into operation, the microwaves 14 of the generator heat the material 26 in the second housing chamber 24 or reactor chamber 28. Because of the small flow channels present in the gas-permeable, particularly porous material 26 there is a large contact surface present between the material 26 and the waste gas, as a result of which an effective and even heating of the waste gas takes place. At the same time the thermal and thermal-catalytic conversion of the waste gas occurs, the gas components of which or concentration of which is monitored or determined by the sensor 9, which is able to determine the substances contained therein e.g. $O_2$, $CO_2$, CO, $NO_x$, total carbon, and the like, and to pass on corresponding control or regulating signals to the control or regulating device 10. By means of the temperature sensor or sensors 6,7 the temperature in the reactor chamber 28 can be controlled or regulated by the control or regulation of the output of the microwave generator 3, e.g. through switching on and off, or regulation of a fixed temperature progression, e.g. inversely proportional to the temperature in the reactor chamber can be achieved.

In a corresponding manner a control or regulation of the waste gas throughput quantity, in dependence on the pressure and/or the temperature in the discharge line 5 and/or the temperature in the device 1, is also possible.

The treatment process is preferably started up with air free of pollutant substances or in special cases with a specific gas treatment with an inert gas. If a corresponding pressure signal is present at the pressure sensor 8, the microwave generator 3 is switched on, as a result of which the reaction layer 26a heats. After reaching a certain temperature, preferably the reaction temperature of the gas which is present, indicated by the temperature sensor 7, the supply of the air free of pollutant substances or the supply of inert gas is reduced, possibly to zero, and the supply of the waste gas is increased in an opposing manner.

The signal of the sensor 9 can also serve to control or regulate the output of the microwave generator 3 and/or the throughput of gas and/or the proportion of gas (air free of pollutant substances/waste gas or inert gas/gas).

In the above-described exemplary embodiment, through the first material layer 25a there is on the one hand a thorough mixing of the waste gas or the gas mixture, and on the other hand a backfire is prevented ("Ex"-protection), which is of particular importance for explosive gases.

Within the scope of a simple embodiment of the invention it is also possible to provide the gas-permeable material only in the form of a layer or body with a constant content of material which absorbs microwaves, wherein both chambers 23,24 can be filled therewith.

In a modified configuration, it is possible to vary in a specific manner the microwave-absorption property of the material over its length, e.g. to increase or reduce it, as a result of which the temperature is variable.

Moreover it is possible to vary the porousness of the material absorbing microwaves within the layer, as a result of which varying throughput speeds are achieved.

It is moreover possible to provide two or several layers of material absorbing microwaves in the second housing chamber 24 or the reactor chamber 28, with a variation of the absorber content and/or the porousness over the layers.

For a thermal-catalytic combustion process a catalyst in the form of a suitable material described above is allocated to the device 1 in the reactor chamber 28. This catalyst material can likewise be a gas-permeable, in particular a material layer or body in the second chamber 24. Such a single-layer or multi-layer catalyst material can moreover be e.g. metal salts, mixed catalyst material or the like.

Figure 2:
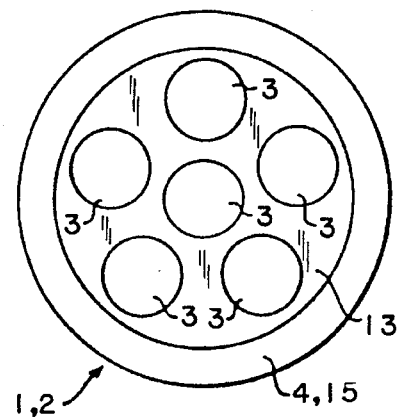
FIG. 2 shows the device in end view from the left, with a modified configuration.

Within the scope of the invention it is possible to operate the microwave generator 3 continually or in pulses. The latter is above all advantageous in reactors of greater output with several microwave generators for achieving an even temperature distribution. In contrast to the configuration according to FIG. 1, in which only one microwave generator 3, especially for small outputs, is provided, several microwave generators can be provided arranged next to each other, e.g. distributed on the end side of the device 1, as is shown in the configuration according to FIG. 2, in which there are provided a central microwave generator 3 and several microwave generators 3 arranged distributed therearound.

With regard to the temperature existing in the reaction zone, this temperature is monitored towards the cold zone by the temperature sensor 6. The signal of this sensor 6 can be utilized for a safety circuit and/or for the following operations, waste gas—closed; fresh air—open; microwave—off.

Downstream of the device 1 or the reactor chamber 28 there can be arranged, for example in the discharge line 5, at least one heat exchanger, in order to use the temperature and recoverable residual enthalpy in treated or cleaned waste gas, preferably for pre-heating the waste gas to be supplied to the device 1 or also for different purposes.

Figure 3:
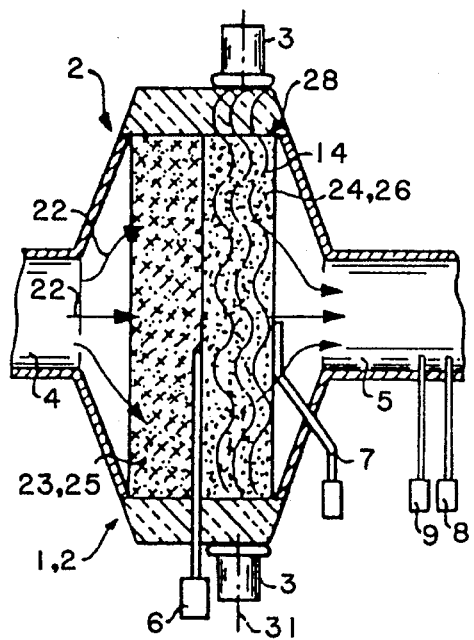
FIG. 3 shows a further modified device according to the invention in axial longitudinal section.

Within the scope of the invention it is also possible to lead the waste gas coaxially through the device 1 and to arrange one or several microwave generators 3, with a direction of action approximately perpendicular to the gas flow, on the periphery of the device 1. Such a configuration is represented in FIG. 3. In this configuration, the reactor housing 2 which, as in the first exemplary embodiment, is round and is possibly of microwave-permeable material, surrounds an inner chamber of preferably double-trapezoidal form, such as shown in FIG. 3. The reactor housing 2 is connected on one side to a feed line 4 and on the other side to a discharge line 5, which are arranged coaxially and the cross-section dimensions of the feed line and discharge line are substantially smaller than the cross-section dimensions of the reactor housing 2. Because of the double-trapezoidal form it is nevertheless possible to have a flow-favourable directing of the gas into the inner chamber of the reactor housing 2 which widens concentrically. With this exemplary embodiment also the first material 25 and the second material 26 are present lying one after the other in the direction of flow and the sensors are also arranged corresponding to the above-described exemplary embodiment, wherein the first temperature sensor 6 here can also be provided between the layers. In contrast to the above-described exemplary embodiment, however, several microwave generators 3 are arranged here distributed over the periphery of the reactor housing 2, namely in a middle plane 31 surrounding the reactor chamber 28, and they feed their microwaves 14 preferably radially inwardly into the reactor chamber 28.

It is advantageous to arrange these microwave generators 3 so that mutual direct irradiation is avoided. This can be achieved in a simple manner by an axially staggered arrangement. Such a staggering can be provided in the peripheral direction as well as in the axial direction, namely in particular if the axial width of the reactor chamber 28 is greater than that shown in FIG. 3.

Otherwise the function and operation of the device 1 according to FIG. 3 corresponds to the above description.

We claim:

1. A process for the thermal treatment of a gas, said process comprising the steps of heating a gas to be processed, by first passing a quantity of said gas to be processed through a gas permeable and microwave permeable primary body and thereafter passing said gas to be processed through a gas permeable secondary body containing microwave-absorbing material, heating the secondary body by radiation with microwaves from a microwave generator and heating the gas to be processed in said secondary body by contacting said gas to be processed with said secondary body as said gas to be processed passes through said secondary body.

2. A process according to claim 1, further including the step of measuring gas temperature in said secondary body and adjusting at least one of an output of the microwave generator and said quantity of said gas to be processed in response to the measured gas temperature.

3. A process according to claim 1, further including the step of measuring gas pressure in the region of said secondary body and adjusting at least one of an output of the microwave generator and said quantity of said gas to be processed in response to the measured gas pressure.

4. A process according to claim 1, including a preliminary step of first passing a gas free of pollutant substances through said primary and secondary bodies and thereafter, in response to a predetermined pressure at said secondary body, decreasing the quantity of said gas free of pollutant substances and passing said gas to be processed through said primary and secondary bodies while applying microwaves to said secondary body.

5. A process according to claim 2 wherein in response to an increase in temperature of said gas to be processed after said gas to be processed has passed through said bodies, an output of the microwave generator is reduced and in response to a decrease in temperature of said gas to be processed after said gas to be processed has passed through said bodies, said output of the microwave generator is increased.

6. A process according to claim 2 wherein in response to an increase in temperature of said gas to be processed after said gas to be processed has passed through said bodies, a quantity of said gas is increased and in response to a decrease in temperature of said gas to be processed after said gas to be processed has passed through said bodies, said quantity of said gas to be processed is decreased.

7. A process according to claim 1, wherein said primary body comprises a fibrous material.

8. A process according to claim 1, wherein said primary body comprises a solid porous material.

9. A device for carrying out a process of thermal treatment of gas, said device comprising a housing which defines a reaction zone, said housing being formed with a gas inlet opening and a gas outlet opening arranged to permit gas to flow along a path which extends through the reaction zone, first and second gas permeable bodies arranged in said reaction zone such that gas flowing along said path first passes through said first body and thereafter passes through said second body, said first body being microwave-permeable and said second body being microwave-absorbent, and at least one microwave generator positioned adjacent to said bodies and arranged to direct microwaves through said first body and into said second body.

10. A device according to claim 9, in wherein said primary body comprise a fibrous material.

11. A device according to claim 9, wherein the material of the second body comprises at least one of ceramics, fibers and composite fiber material.

12. A device according to claim 9, wherein at least one temperature sensor is provided in a region of said second body for determining gas temperature.

13. A device according to claim 9, wherein a pressure sensor is provided at a location in said gas flow path downstream of said second body in the direction of gas flow along said path for determining the gas pressure at said location.

14. A device according to claim 9, wherein at least one of a gas temperature sensor, a gas pressure sensor and a sensor for determining gas concentration of a gas to be treated is located in said gas flow path downstream of said second body to produce sensor signals, and wherein a regulating device is connected to receive said sensor signals and is further connected to vary at least one of an output of a microwave generator and said quantity of gas to be treated in response to said sensor signals.

15. A device according to claim 9, wherein said second body comprises at least two layers which differ from each other in at least one of porosity and microwave absorption capacity.

16. A device according to claim 9, wherein a catalytically acting material is arranged downstream, along said gas flow path from said second body.

17. A device according to claim 9, there are further provided first and second gas feed lines connected to supply, respectively, a gas to be treated and another gas which is free of pollutants, and a valve connected between said gas inlet opening and said gas feed lines, said valve being adjustable to selectively admit gas free of pollutant substances and gas to be treated into said reaction zone.

18. A device according to claim 9, wherein said microwave generator is arranged at one end of said housing and wherein said gas inlet and gas outlet openings are arranged such that the gas flow path extends radially inwardly of the housing in a region of said one end and then extends in the form of an arch in a direction coaxially of the housing toward the end of the housing facing away from the microwave generator.

19. A device according to claim 9, wherein said gas inlet and gas outlet openings are arranged such that said gas flow path extends coaxially through the housing and wherein said at least one microwave generator comprises several microwave generators distributed around the periphery of said housing.

* * * * *